US005805083A

United States Patent [19]

Sutton et al.

[11] Patent Number: 5,805,083

[45] Date of Patent: Sep. 8, 1998

[54] ELECTRONIC PARKING METER OPERATING SYSTEM

[75] Inventors: Joseph H. Sutton; J. Michael Rodgers, both of Harrison, Ark.; Ralph H. Carmen, Merritt Island, Fla.

[73] Assignee: Duncan Industries Parking Control Systems, Harrison, Ark.

[21] Appl. No.: 848,559

[22] Filed: Apr. 28, 1997

[51] Int. Cl.[6] .................................................... B60Q 1/48

[52] U.S. Cl. ......................... 340/932.2; 194/217; 368/90

[58] Field of Search ............................ 340/932.2, 309.15, 340/539, 825.31, 825.5, 825.51, 825.52, 825.54; 194/205, 217, 318, 902, 216, 317; 368/7, 90

[56] References Cited

U.S. PATENT DOCUMENTS 4,880,097 11/1989 Speas ..................................... 194/239
5,103,957 4/1992 Ng et al. ................................ 194/217
5,546,348 8/1996 Honma et al. ..................... 365/230.03
5,642,119 6/1997 Jacobs ...................................... 342/69

*Primary Examiner*—Nina Tong
*Attorney, Agent, or Firm*—Rudnick & Wolfe

[57] ABSTRACT

An electronic parking meter operating system comprising a microprocessor mounted within a meter housing, a semiconductor disc memory having at least 8K memory bytes, and a plurality of programs stored in the disc memory. A meter event such as the deposit of a coin will cause interrogation of an auxiliary program module map to determine if one of the plurality of programs should be used to substitute for or augment a program which is provided in the microprocessor to normally carry out meter functions. If substitution or augmentation is called for, an address table in the memory disc is used to locate the selected program, to load it into the microprocessor, and to execute the program.

4 Claims, 2 Drawing Sheets

ELECTRONIC PARKING METER OPERATING SYSTEM

This invention relates to parking meters having electronic components. Such meters typically include upper and lower housings usually containing a cash box for coins and tokens deposited in the meter. The upper housing typically incorporates a display window through which a digital display can be observed.

The digital display may be a component of a mechanism which is receivable within the upper housing and removable therefrom. This mechanism will also incorporate a coin slot and, in more recent times, a card slot for receiving a debit card or the like.

The mechanism of a typical electronic parking meter also incorporates a power source such as a battery. A microprocessor programmed to operate the digital display in accordance with time purchased, time remaining, and time expired conditions is contained in the mechanism. Other electronic components, operating in conjunction with the microprocessor, may perform functions such as coin and card validation, recording of meter activity, and vehicle presence sensing. Communication may also be established by virtue of plug-in or infrared capability to perform such functions as retrieving information on meter activity which has been stored by the mechanism, and to alter the cost/time rate of a mechanism.

As described in the jointly-owned application Ser. No. 08/844,159, filed Apr. 18, 1997 entitled "Parking Meter With Peripheral Functions", it is desirable to increase the versatility of parking meters. In particular, one or more peripheral devices may be associated with the meter for performing functions related to parking and also unrelated functions such as, for example, controlling tennis court lights.

SUMMARY OF THE INVENTION

This invention relates to electronic parking meters which employ microprocessor control. In particular the invention involves the electronic architecture of a meter comprising a ROM based microcomputer device containing parking meter operating system software with input/output resources to manage normal meter functions such as a liquid crystal display, coin acceptance, rate computation, smart card interface, etc. The system also includes a separate semiconductor disc memory. The system can support an extremely large memory, for example, up to 274 billion bytes of semiconductor disk memory but may also involve much lower capacities such as 8K or 32K bytes.

The semiconductor disc memory is used for storage of meter program parameters, for example, those dealing with time to be paid for the deposit of a quarter. In addition, executable programs for extension of the meter functionality are stored in this disc memory. Such an extended function may comprise, for example, using the meter to turn on tennis court lights.

The operating system software thus supports auxiliary programs stored on the semiconductor disc. These programs can:

1. Replace the meter's normal functions for coin acceptance, rate processing, display management and communications, or,
2. Augment normal program functions. In this capacity the system will initiate a function other than a normal meter function either before or after performing a normal function.

The semiconductor disc memory of the system preferably is divided into sectors with certain sectors containing pre-assigned files used in system operation. In a preferred embodiment, a first sector contains a directory and audit file. The last three sectors of the memory are reserved for special events, coin acceptance, and a "scratch pad" for maintenance logging, etc.

Rates and rate schedules are stacked on top of the last three sectors. Sectors between these pre-assigned sectors are then available for auxiliary program files.

By building the disc memory from the top and from the bottom, addition of auxiliary programs and/or extension of the programmable parameter files is achieved without total system reconfiguration thereby minimizing reprogramming communication time.

In addition, with a semiconductor disc memory system with binary addressing, the first and last file locations are always known, no matter how large the memory. Thus, the first location will always have all "0" bits as the address and the last address will always be made up of all "1" bits. The first and last locations of the system will always operate the same way with discs of any size, and all other files can then be referenced either to the first or last sectors.

DESCRIPTION OF THE PREFERRED EMBODIMENT

Figure 1:
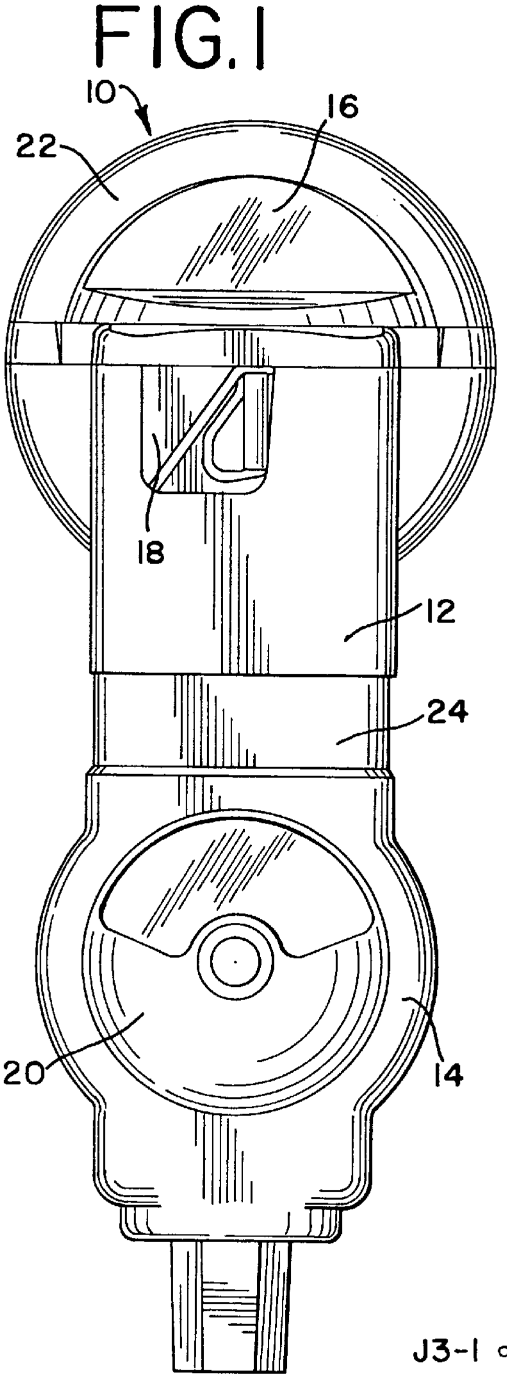
FIG. 1 is a front elevational view of a parking meter of the type adaptable to the concepts of this invention.

FIG. 1 illustrates a parking meter 10 consisting of an upper housing 12 and lower housing 14. The upper housing defines display window 16 and a payment means 18, which may accommodate coins, tokens, debit cards, and the like, is located on one side of the housing. The lower housing is designed to hold a cash box and security door 20 is provided for access thereto.

The top 22 of upper housing 12 is removable to permit installation of a mechanism including the payment means 18 and also including digital display which is visible through window 16. The digital display, infrared communication functions, and other standard meter functions, are controlled by a microprocessor mounted on a PC board located in the mechanism interior. "Biscuit" 24 may be installed in between the upper and lower housings, and may serve as a housing for peripheral meter functions such as a vehicle sensor.

Figure 2:
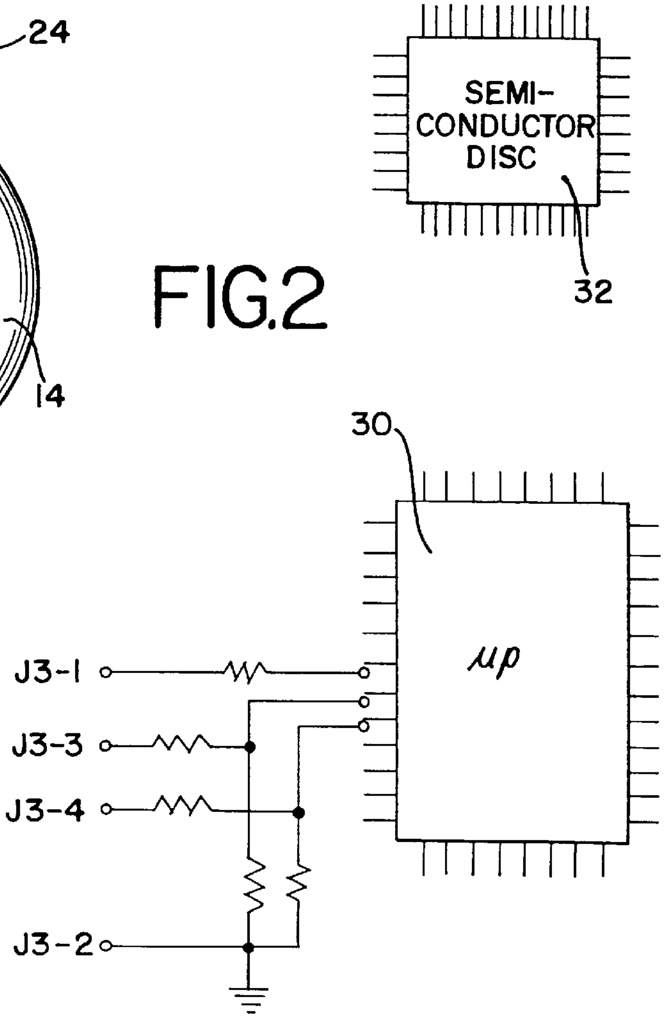
FIG. 2 is a schematic illustration of an electronic system characterized by the features of this invention; and, FIG. 3 is a diagrammatic illustration of an operating sequence.

The electronic architecture of the invention involves the use of a ROM based microcomputer or microprocessor 30 shown in FIG. 2. This microprocessor which may be, for example, a Mitsubishi M38275 type, includes input/output connections and these are employed in part to achieve normal meter functions such as coin sensing, card verification, time display, etc. Additional connections (J3–1 to J3–4) may be used for a modular jack for communication with peripheral devices as described in the aforementioned copending application.

A semiconductor disc memory 32 includes input/output connections for interfacing with microprocessor 30. This memory could be the same as used in typical products, such as a Xicor 28C64/256. The memory capacity could be 8K bytes or lower up to 274 billion bytes or even higher. The larger memory capacity permits the storage of numerous programs which can then be implemented in the course of the parking meter usage.

Storage of meter program parameters is among these possibilities. These may comprise, for example, variations in the amount of time to be given for a specific payment. In addition, the disc memory may store executable programs for extension of the meter functions, for example, to turn on lights when a coin is accepted.

The invention employs meter operating system software comprising a program stored in the microprocessor 30. This software provides support for the programs stored in the memory disc 32 when extended functions are called for. As noted, these auxiliary programs can do two things:

1. Replace normal program functions. Thus, without the programs on the memory disc, the meter will function normally for coin acceptance, rate processing, display management and communication. The memory disc makes available additional programs for carrying out these functions. Alternatively, the replacement programs may be independent of normal meter functions and may comprise, for example, those intended to carry out peripheral functions using connections J3–1 to J3–4 such as vehicle presence sensing, data interchange, power dispensing control and other functions as described in the aforementioned copending application.
2. Augment normal program function. In this case, the memory disc makes available programs which can be executed before or after the normal meter function has taken place.

At each significant event in meter operation, the operating system interrogates an auxiliary program module map which contains information regarding whether there is a replacement or augmentation program for a given meter function. If not, the meter functions normally. If a replacement or augmentation program exists it is loaded from the semiconductor disc and executed in place of or in addition to the normal function.

Figure 3:
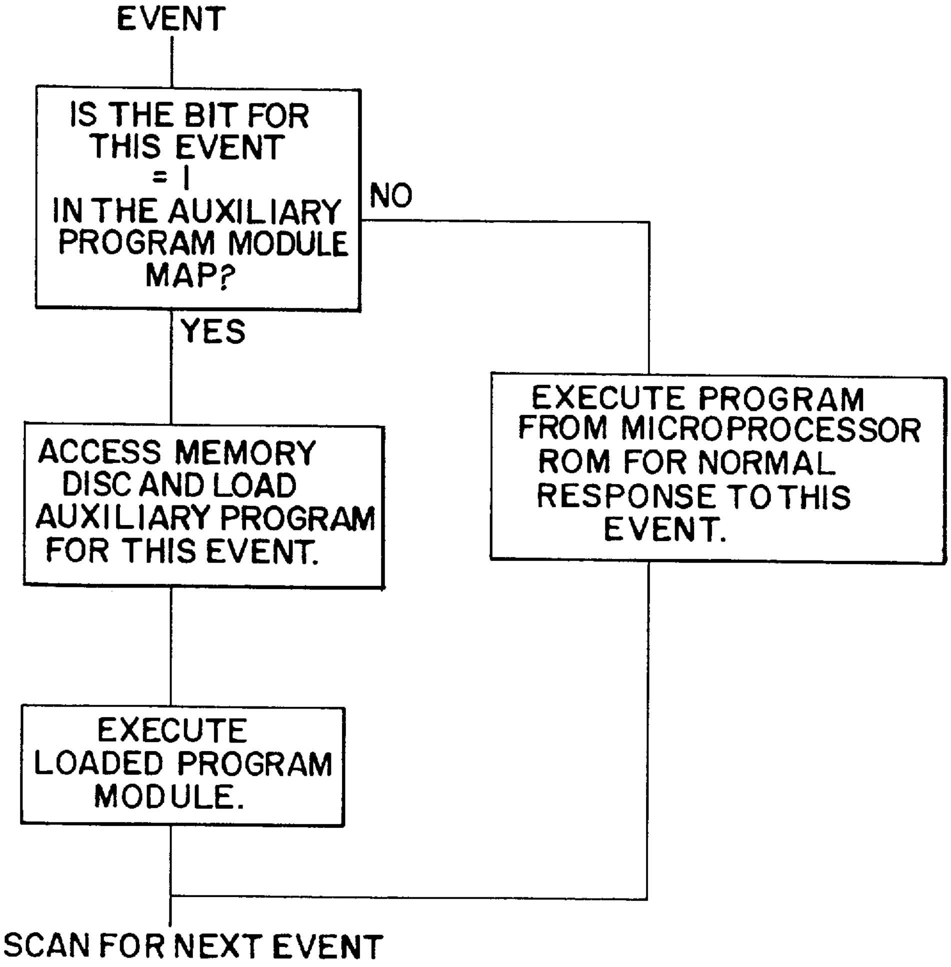

The "flow diagram" of FIG. 3 illustrates an example of meter operation using the system of the invention. The auxiliary program module map is consulted whenever a significant event in the meter operation occurs. Such an event could involve, for example, the insertion of a card or coin, or a communication from some external source such as a handheld infrared device or a vehicle presence sensor. If the bit in the auxiliary program module map associated with the event is not set (=0) then the normal software for response to the event is executed on microprocessor 30.

If the bit associated with the event is set (=1) in the auxiliary program module map then the memory disc is accesssed to select the correct program for execution in response to the event.

The selected program is loaded into microprocessor 30 and executed.

Once an auxiliary program is running, the operating system software contained in the ROM within microprocessor 30, supports program execution with access to an arithmetic package, i/o drivers, a communications package, memory management functions, e.g., directory, load, save, etc., and execution management functions, e.g., chaining to an extension of the auxiliary program and calling of auxiliary subroutines.

The basic unit of semiconductor disc memory which is allocated is 256 bytes long (a sector). Certain sectors of the disc contain pre-assigned files used in system operation.

The first sector contains the directory and audit file. The last three sectors are reserved for special events, coin acceptance and global control parameters, and a scratch pad for maintenance logging, etc. Rates and rate schedules are stacked on top of the last three sectors with the number of sectors allocated for each being dependent on the system requirements. Auxiliary program files are added after the directory and may extend up to the rate schedule. The following table depicts the disk structure (where rl is rate file length and sl is schedule file length).

| Sector | Content |
|---|---|
| 1 | Directory & Audit |
| 2 to last-rl-sl-3 | Replacement/augmentation program files |
| last -2-rl-sl | Rate schedules |
| last -2-rl | Rates |
| last-2 | Special Events |
| last-1 | Coin and global control parameter |
| last | Scratch pad |

The building of programs down from the top of the disk and programmable parameters up from the bottom permits addition of auxiliary programs and/or extension of the programmable parameter files without total system reconfiguration. This is important in minimizing reprogramming communication time.

Further, for a semiconductor disk memory system with binary addressing the first (directory) and last (scratch) locations are always known absolutely, independent of the size of the memory. The first location is all address bits =0 and the last is all address bits =1. Since in the disk structure above all files are referenced either to the first or last locations the system operates with different size semiconductor disk memories completely transparently.

The structure of the directory for operating system management is similar to the overall file structure building from the top with auxiliary program related data and from the bottom with parameter related data.

auxiliary program module bit map: bytes 1–16 auxiliary program file address table: bytes 17–122 last program file address: 123 extra parameter file address: 124 rate schedule file address: byte 125 rate file address: byte 126 directory sanity check: bytes 127–128

The auxiliary program module bit map has a single bit assigned to each major function of the parking meter. If a bit associated with a particular meter function is 0 then the function is performed normally. If the bit is a 1, then the operating system refers to the auxiliary program file address table, obtains the disk address for the associated auxiliary program, loads the program and executes the program.

The last program file address locates a sector beyond the end of system auxiliary program files so that if an auxiliary program is to build a database on the disk, this sector is selected avoiding overwriting of program files. The extra parameter file address locates an optional sector in which programmable parameters to be used by auxiliary programs may be stored. The file addresses for rates and rate schedules occupy the last two usable entries in the directory.

The following is a listing of auxiliary program module bit map definitions and auxiliary program file address indices which may be used in the operating system for auxiliary program management.

background auxiliary programs 1. each half second replacement
2. flag display replacement
3. lcd display replacement
4. lcd driver replacement
5. real time schedule replacement 6. real time schedule augmentation
7. expire time replacement
8. expire time augmentation coin processing auxiliary programs 1. coin preamble augmentation
2. coin acquisition replacement
3. coin acquisition augmentation
4. coin evaluation replacement
5. coin accept augmentation
6. coin reject augmentation rate processing auxiliary programs 1. rate preamble augmentation
2. split rate replacement
3. split rate augmentation
4. deferred time and time left replacement
5. deferred time augmentation
6. rate process exit augmentation infrared communications auxiliary programs 1. infrared communications preamble augmentation
2. extended infrared communications functions augmentation
3. infrared communications exit augmentation
4. communications security process replacement key and card auxiliary programs 1. key and card preamble augmentation
2. key input/output process replacement
3. key and card accept augmentation
4. key and card reject augmentation memory card auxiliary programs 1. memory card input/output replacement local bus auxiliary programs 1–8 local bus process augmentation program modules miscellaneous auxiliary programs 1. initialization process augmentation
2. quarter hour check replacement
3. time trigger replacement
4. recalibration augmentation
5. external system interrupt augmentation high speed bus auxiliary programs 1–4 high speed bus augmentation program modules auxiliary subroutines some number of subroutine program modules (number limited by sizes of system memory configured)

Advantages of the described architecture as compared to parking meters which simply employ a microprocessor with external program memory, the maximum size of which is dictated by the processor manufacturer, are:

The system is extensible essentially without bound both in available memory and functionality.

The core ROM based operating system support makes utilization of the disc memory for programming highly efficient.

Production costs are lower since no programming is required at production time.

Programming is a single step process performed at delivery time. Also, no sockets are required for external program memory.

Reliability is improved with no need for external memory sockets.

The core ROM based operating system support makes development of new applications easier since system programming for most meter functions is already in place and since the system is designed to allow auxiliary programs to be added employing the built-in communications package.

The use of the local bus interface as described in the aforementioned copending application is facilitated. Thus, the programs for operating a large number of peripheral devices which may have unique features for coin processing, LCD display, rate structure schedules and various events such as lighting, security and vehicle sensing are readily accessible with the system of the invention.

It will be understood that various changes and modifications may be made in the systems of this invention without departing from the spirit of the invention particularly as described in the following claims.

Which is claimed:

1. A method for operating an electronic parking meter wherein said meter includes a housing, a microprocessor located within said housing for controlling parking meter functions in response to an event, an independent semiconductor disc memory having at least 8K memory bytes connected to said microprocessor, and an auxiliary program module map, the method comprising the steps of storing programs in said disc memory, interrogating said module map upon occurrence of a meter operation event to determine if one of said programs is to be used when that event occurs, and loading said one program in said microprocessor and executing said one program if the program is to be used; wherein said one program either is a substitute for a parking meter function otherwise controlled by the microprocessor or augments a parking meter function controlled by the microprocessor; wherein said disc memory programs include a directory, said module map being included in said directory, providing an address table for auxiliary programs to substitute for and augment said parking meter functions, and including the further steps of assigning a map bit to each said event, referring to said address table if said one program is to be used, obtaining the address in the disc memory for said one program, and then loading and executing the one program.

2. An electronic parking of the type having a housing and including a microprocessor provided within the housing for controlling parking meter functions, an independent semiconductor disc memory having at least 8K memory bytes connected to said microprocessor, an auxiliary program module map, a plurality of programs stored in said disc memory, means for interrogating said auxiliary program module map upon occurrence of a meter operating event to determine if one of said plurality of programs is to be used, and means for loading said one program in said microprocessor and executing said one program if the program is to be used; said plurality of programs comprise substitutes for programs in said microprocessor and augmentations of programs in said microprocessor; wherein said plurality of programs include a directory, said auxiliary program module map forming part of said directory, and an auxiliary program file address table forming part of the directory, said address table forming part of the means for loading said one program in said microprocessor; wherein said directory is located in the first sector of the memory disc, auxiliary programs are located in the sectors following the first sector, and additional programs are located in the last sectors of the disc memory.

3. A method for operating an electronic parking meter wherein said meter includes a housing, a microprocessor located within said housing for controlling parking meter functions in response to an event, an independent semiconductor disc memory having at least 8K memory bytes connected to said microprocessor, and an auxiliary program module map, the method comprising the steps of storing programs in said disc memory, interrogating said module map upon occurrence of a meter operation event to determine if one of said programs is to be used when that event occurs, and loading said one program in said microprocessor and executing said one program if the program is to be used; partitioning said semiconductor disc memory into two separate data sets, one addressed at location 0 and the other at a binary address consisting of all 1's, thus enabling unique and transparent access to the separate data sets independent of the size of the disc memory.

4. An electronic parking of the type having a housing and including a microprocessor provided within the housing for controlling parking meter functions, an independent semiconductor disc memory having at least 8K memory bytes connected to said microprocessor, an auxiliary program module map, a plurality of programs stored in said disc memory, means for interrogating said auxiliary program module map upon occurrence of a meter operating event to determine if one of said plurality of programs is to be used, and means for loading said one program in said microprocessor and executing said one program if the program is to be used; wherein said semiconductor disc memory is partitioned into two separate data sets, one addressed at location 0 and the other at a binary address consisting of all 1's, thus enabling unique and transparent access to the separate data sets independent of the size of the disc memory.

* * * * *